United States Patent [19]
Goto et al.

[11] 3,800,764
[45] Apr. 2, 1974

[54] EXHAUST GAS RECYCLING SYSTEM

[75] Inventors: Kenji Goto; Kiyohiko Mizuno, both of Susono, Japan

[73] Assignee: Toyota Jidosha Kogyo Kabushiki Kaisha, Aichi-Ken, Japan

[22] Filed: Sept. 5, 1972

[21] Appl. No.: 286,358

[30] Foreign Application Priority Data
Mar. 14, 1972  Japan.......................... 47-29966[U]

[52] U.S. Cl............................................. 123/119 A
[51] Int. Cl............................................. F02m 25/06
[58] Field of Search................................ 123/119 A

[56] References Cited
UNITED STATES PATENTS
3,444,846   5/1969   Sarto et al. ..................... 123/119 A
3,542,004   11/1970  Cornelius........................ 123/119 A

*Primary Examiner*—Wendell E. Burns
*Attorney, Agent, or Firm*—Stevens, Davis, Miller & Mosher

[57] ABSTRACT

An exhaust gas recycling system for an internal combustion engine having an intake system for introducing a fuel-air mixture into the engine; an exhaust system for discharging exhaust gases from the engine to the atmosphere; a recycling pipe connected to both the intake system and the exhaust system for recycling exhaust gases; and a device for modifying the volume of the recycling exhaust gases through the recycling pipe, responsive to changes in the pressure in an intake manifold of the inlet system, including a device for sensing the intake manifold pressure, the sensing device having a diaphragm chamber, a diaphragm positioned in the diaphragm chamber, an induction pipe connected to both the intake manifold and the diaphragm chamber through which the pressure in said intake manifold propagates to the diaphragm chamber, and a device for retarding the propagation of the pressure from the intake manifold to the diaphragm chamber.

4 Claims, 2 Drawing Figures

PATENTED APR 2 1974   3,800,764

EXHAUST GAS RECYCLING SYSTEM

This invention relates to an exhaust recycling system for reducing noxious nitrogen oxides in the exhaust gases from an internal combustion engine for a vehicle, and more specifically to a control valve for controlling the amount of exhaust gases which is recirculated from the exhaust system into the fuel and air inlet system according to the operating conditions of the engine, or/and the speed of the vehicle.

The content of nitrogen oxides formed in a combustion chamber of the engine can be most effectively reduced by decreasing the combustion temperature in the combustion chamber. Therefore, exhaust gas recycling systems have been proposed whereby, in view of the fact that most of the exhaust gases are inert, a part of the exhaust gas is introduced into the combustion chamber so as to attain a sufficient cooling effect to cause a drop of the combustion temperature. Typically such systems are constructed so that a part of the exhaust gases is taken out from a point upstream of the muffler of the exhaust system and introduced into a duct between the venturi and the throttle valve of the carburetor through an exhaust gas recycling pipe, under control by a control device. In this case the control device is required to satisfy the following conditions:

1. the device must keep the exhaust gases from being recycled during periods of high engine-load or high vehicle speed because of the time the nitrogen oxide content of the exhaust is maintained at a relatively low level by the action of the power system of the carburetor; and in the event of any hazardous overheating of the engine and its associated parts because the engine might be overheated more by exhaust gas recycling.
2. It must not quickly start or stop the exhaust gas recycling because exhaust gas recycling causes a sudden drop of the engine output. Consequently, it gives the driver a bad feeling in operating the car.

3. Further, it must sustain the recycling gas for a while after acceleration because a lag of fuel supply behind the acceleration may temporarily produce a too lean a fuel-air mixture and excessive nitrogen oxide emission.

A control valve device of the conventional type is so constructed as to cooperate with a diaphragm which in turn is controlled by a negative pressure of an intake manifold, simply to allow a valve mechanism to open or close the exhaust gas recycling pipe. It is also equipped with a solenoid valve, which is located in a conduit through which the negative pressure of the intake manifold is conducted to the diaphragm. The solenoid valve opens or closes the pipe in response to a vehicle-speed signal or the like. In this way the control valve device meets the first of the requirements enumerated above. However, because the starting and stopping of the exhaust gas recycling are suddenly effected according to changes of the negative pressure of the manifold, the torque is widely varied even, under the same throttle opening, and thus the riding comfort of the driver is unfavorably affected. Moreover, the quick recovery of the atmospheric pressure in the manifold immediately after the acceleration causes instant stopping of the recycling and fails to reduce the formation of nitrogen oxides for some time.

SUMMARY OF THE INVENTION

The present invention obviates the aforementioned disadvantages of the prior arts and improves the performance significantly.

An object of the invention is to provide an exhaust gas recycling system which can reduce the amount of nitrogen oxides produced in an engine even when the engine load increases quickly.

Other objects and features of the invention will be apparent from the following description of the invention which has a device for retarding the propagation of the pressure in an intake manifold to a diaphragm chamber of an intake manifold pressure sensing device. In the accompanying drawing:

FIG. 1 schematically shows an embodiment of an exhaust gas recycling system for an internal combustion engine; and FIG. 2 is a cross section of a regulating valve used in the system shown in FIG. 1.

DESCRIPTION OF THE PREFERRED EMBODIMENT:

Figure 1:
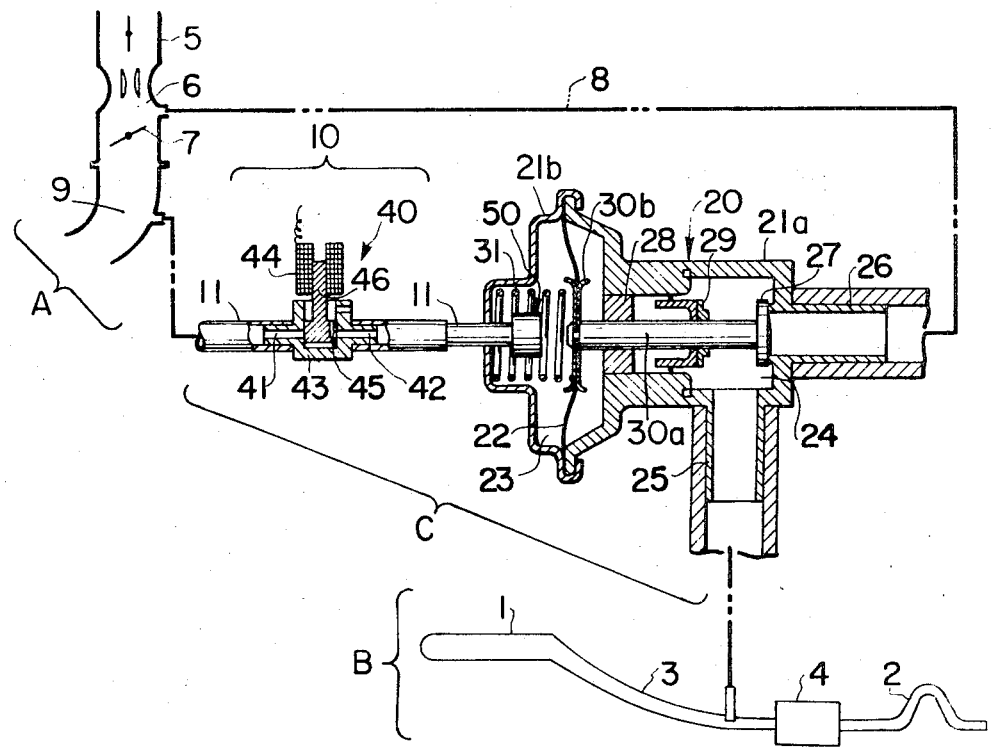

In FIG. 1, an exhaust gas recycling system comprises a fuel-air mixture intake system A for introducing a fuel-air mixture into an engine (not shown), an exhaust system B for discharging exhaust gases from the engine to the atmosphere, a recycling pipe 8 connected to both the inlet system and the exhaust system, and a control device C for modifying the volume of the exhaust gas through said recycling pipe 1. Control device C further comprises an operating means 20 responsive to the engine load and an engine load sensing means 10.

Intake system A comprises a carburetor 5 which has a venturi 6 and a throttle valve 7 installed in a duct thereof, and an intake manifold 9. In general the amount of fuel-air mixture introduced into the engine is changed by displacing valve 7 in conformity with the engine load. That is, as the engine load increases, throttle valve 7 is widely opened, and the pressure in intake manifold 9, thereby, becomes higher.

Exhaust system B comprises an exhaust manifold 1 connected to exhaust ports of the engine, an exhaust pipe 3, a muffler 4 and a tail pipe 2.

Recycling pipe 8, which extends from exhaust system B through control device C to intake system A, is connected to exhaust pipe 3 at an end thereof, and at the other end thereof to the duct between venturi 6 and throttle valve 7, of carburetor 5.

Recycled flow from exhaust system B to intake system A is controlled by a valve 27 which constitutes a part of operating means 20 of control device C. When valve 27 is open, exhaust gases flow through conduit 25, through a valve chamber 24 and through conduit 26 into recycling pipe 8. When valve 27 is closed recycling is prevented.

The control of valve 27 is effected by a diaphragm 22 and a spring 31. The diaphragm responds to the pressure in a negative pressure chamber 23 which senses the pressure in intake manifold 9. The pressure in negative pressure chamber 23 is normally equal to the pressure in intake manifold 9 which represents the engine load. When the engine load is small, the pressure in intake manifold 9 and in negative pressure chamber 23 are small and diaphragm 22 is attracted, overcoming the thrust of spring 31 so that valve 27, thereby is open.

On the contrary when the engine load is large, valve 27 is closed by spring 31. In a transient state, particularly the pressure in intake manifold 9 changes suddenly, the propagation of the pressure change is retarded by a regulating valve device 50, which is a part of the invention. Consequently, the pressure in negative pressure chamber increases or decreases slowly even at the time the pressure in intake manifold 9 changes quickly.

Operating means 20 comprises a casing 21a which defines a part of diaphragm chamber. A diaphragm 22 is positioned in the diaphragm chamber and this diaphragm 22 is connected by a valve shaft or a rod 30a to a valve 27. A bearing 28 is attached within casing 21 to guide the valve shaft or rod 30a as it moves in response to action of diaphragm 22. Diaphragm 22 is biased by a spring 31 toward a position in which valve 27 is closed. Spring 31 is interposed between casing 21b and a spring seat 30b which is attached with diaphragm 22.

Figure 2:
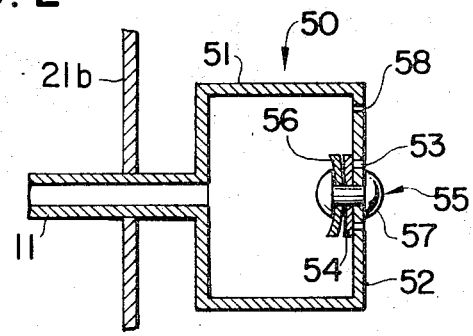

The intake manifold pressure sensing means 10 comprises a negative pressure chamber 23 defined by casing 21b and diaphragm 22, an induction conduit 11 which connects negative pressure chamber 23 to intake manifold 9, and a regulating valve device 50 disposed at an end of induction conduit 11 in negative pressure chamber 23. The propagation of pressure from intake manifold 9 to negative pressure chamber 23 is regulated by regulating valve device 50. Regulating valve device 50 is explained in detail referring to FIG. 2. A valve casing 51 of regulating valve device 50 is provided integrally at the front end of induction conduit 11 which extends into the negative-pressure chamber 23. To about the center of the side wall 52 of the casing 51 opposed to the diaphragm 22 there is attached a check valve 55, which consists of a communicating hole 53 and a flexible valve body 54, by means of a pressure plate 56 and a pin 57, in such a way as to open the communicating hole 53 when the pressure in the casing 51 is lower than that in the negative-pressure chamber 23. In some other part of the same side wall 53 is disposed a small hole 58 to equalize the pressures in the negative-pressure chamber 23 and the casing 51. Control device C further comprises a solenoid valve 40 in order to prevent the engine output from decreasing at the time of high speed operation or to prevent overheating of the engine. Solenoid valve 40 stops the recycling of exhaust gas when it receives signals which are output from such devices (not shown) sensing the speed of the vehicle or the engine temperature.

Solenoid valve 40, shown in FIG. 1, which characterizes a three way valve, comprises a casing 43, a valve 46 and a solenoid 44 which is energized by such devices for sensing the speed of the vehicle or so. Casing 43 has a valve chamber 47 therein which communicates to intake manifold 9 through an inlet 41 and induction conduit 11, the other hand, through an outlet 42 and induction conduit 11 to negative pressure chamber 23. Valve chamber 47, further communicates to the atmosphere through a hole in a wall of the casing 43. Thus, under the normal cruising conditions no signal is given to the solenoid 44, and the valve body 46 is in the upper position thereby keeping the inlet 41 in communication with the outlet 42 and allowing the vacuum from the intake manifold 9 to be conducted inside of the casing 51 of regulating valve device 50. Consequently, the vacuum opens check valve 55 and acts on diaphragm 22 in negative-pressure chamber 23 of the control valve device 20. When the negative pressure has exceeded a predetermined value, the valve body 27 is moved with diaphragm 22 against the spring 31, whereby outlet 26 of the control valve 20 is opened to enable exhaust gas recirculation. Under such conditions, for example when the engine is dangerously overheated during high-speed running of the vehicle, a signal is given to solenoid valve 40 to move the valve body 46 downward, so that the atmospheric pressure acts on diaphragm 22 through regulating valve device 50 and negative-pressure chamber 23, with the result that valve body 27 of the control valve 20 is moved rightward to close the outlet 26 and stop the exhaust gas recirculation. In this case, however, the pressure inside the casing 51 of regulating valve device 50 becomes atmospheric before the pressure inside the negative-pressure chamber 23 reaches that level. As a result, the check valve 55 is closed by the pressure differential between casing 51 and negative-pressure chamber 23, and the pressure inside the negative-pressure chamber is gradually equalized to that in the casing 51 through small hole 58. In this way the movement of the valve body 27 is slowed down and the stopping of the exhaust recirculation through the outlet 26 is moderated.

At high engine load conditions, for example at the time of acceleration, the suction force that works on diaphragm 22 in the negative-pressure chamber 23 is decreased in proportion to the negative pressure in intake manifold 9, and accordingly the valve body 27 closes the outlet 26 to stop the exhaust recirculation. However, even immediately after such acceleration, the check valve 55 is closed and the pressure equalization is achieved through the small hole 58 so that the opening of the outlet 26 is gradually decreased, instead of immediately closing, to continue the exhaust recirculation for a predetermined length of time. When the exhaust gas recirculation has been stopped in this manner, the pre-starting condition is regained because the pressure inside negative-pressure chamber 23 is substantially atmospheric. When the pressure inside the casing 51 of the valve mechanism 50 has become negative, the check valve 55 opens at once, but the negative pressure slowly acts on the diaphragm 22 through the small-diameter communication hole 53 and the small hole 58, whereby the movement of the valve body 27, that is, the exhaust recirculation by the opening of the outlet 26, is slowly effected.

As has been described above, according to the present invention, the stopping of the exhaust recirculation is moderately accomplished and thereby the shock due to a change in the engine output can be prevented, with the consequence that the riding comfort of the driver is improved. Although it may be feared that the time lag in the actuation of the control valve device 20 causes an insufficient output and an uncomfortable shock to the driver, the effect of the lag is actually so small and practically negligible for the average drivers. Moreover, because the recirculation can be sustained for a predetermined period of time immediately after the acceleration, the formation of noxious nitrogen oxides is reduced. Further, the system is extremely simplified in construction and can be mounted on a vehicle without any major modification to the existing exhaust recirculation system.

While one specific embodiment of the invention has been described in detail above, it is to be understood that various modifications may be made from the specific details described without departing from the spirit and scope of this invention.

What is claimed is:

1. In an exhaust gas recycling system for an internal combustion engine having an intake system for introducing a fuel-air mixture into said engine, an exhaust system for discharging exhaust gases from said engine to the atmosphere, a recycling pipe connected to both said intake system and said exhaust system, and means for modifying the volume of the recycling exhaust gas through said recycling pipe responsive to changes in the pressure in an intake manifold of said inlet system, including means for sensing the intake manifold pressure, the improvement that comprises a sensing means including;

a diaphragm chamber,
a diaphragm positioned in said diaphragm chamber, an induction pipe connected to both said intake manifold and said diaphragm chamber through which the pressure in said intake manifold propagates to said diaphragm chamber, and means for retarding the propagation of the intake manifold pressure to said diaphragm chamber, said retarding means comprising: a wall installed in said induction pipe for closing said induction pipe, said wall having therein two holes through which said diaphragm chamber is communicated to said intake manifold, and a normally closed check valve means disposed in said wall at one of said holes, said check valve means being adapted to open said hole when the pressure in said diaphragm chamber is higher than that in said intake manifold, the other of said holes being open.

2. The exhaust gas recycling system in claim 1, wherein said check valve means comprises:

a flexible plate fixed on said wall at some part thereof inside said chamber, normally closing said hole, said flexible plate being adapted to bend to open said hole when the pressure in said diaphragm chamber is higher than that in said intake manifold.

3. In an exhaust gas recycling system for an internal combustion engine having an intake system for introducing a fuel-air mixture into said engine, an exhaust system for discharging exhaust gases from said engine to the atmosphere, a recycling pipe connected to both said intake system and said exhaust system, and means for modifying the volume of the recycling exhaust gas through said recycling pipe responsive to changes in the pressure in an intake manifold of said inlet system, including means for sensing the intake manifold pressure, the improvement that comprises a sensing means including;

a diaphragm chamber,
a diaphragm positioned in said diaphragm chamber, an induction pipe connected to both said intake manifold and said diaphragm chamber, and extending into said diaphragm chamber, through which the pressure in said intake manifold propagates to said diaphragm chamber, and means for retarding the propagation of the intake manifold pressure to said diaphragm chamber attached at the end of said induction pipe in said diaphragm chamber, said retarding means comprising: a second chamber communicated to said intake manifold, said chamber having in a wall thereof two holes through which said second chamber communicates with said diaphragm chamber; and a normally closed check valve means disposed in a wall of said second chamber at one of said holes, said check valve means being adapted to open said hole when the pressure in said diaphragm chamber is higher than that in said intake manifold.

4. The exhaust gas recycling system in claim 3, wherein said check valve means comprises:

a flexible plate fixed on said wall at some part thereof inside said second chamber, normally closing said hole, said flexible plate being adapted to bend to open said hole when the pressure in said diaphragm chamber is higher than that in said intake manifold.

* * * * *